UNITED STATES PATENT OFFICE.

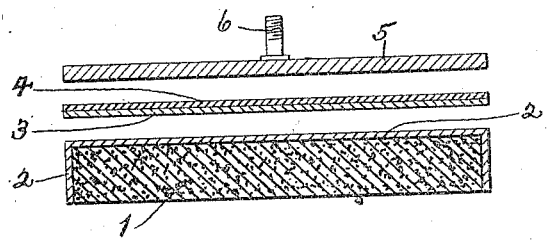
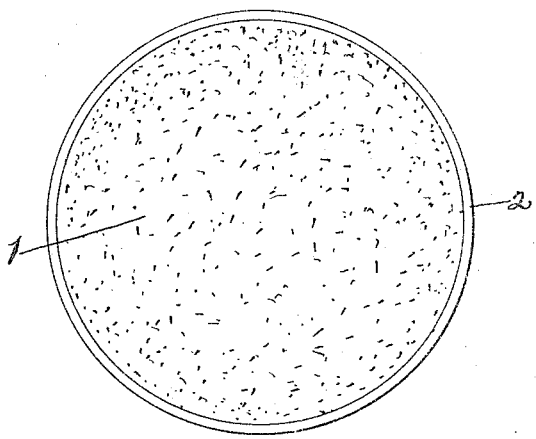
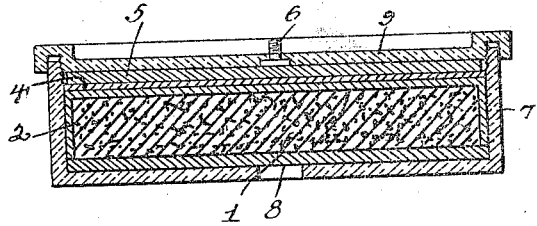

WILLIAM BROAD, OF BEAVER FALLS, PENNSYLVANIA.

RENEWAL ELEMENT FOR SEMI-DRY-CELL BATTERIES.

1,106,540.

Specification of Letters Patent. Patented Aug. 11, 1914.

Application filed April 17, 1913. Serial No. 761,671.

*To all whom it may concern:*

Be it known that I, WILLIAM BROAD, a citizen of the United States, residing at Beaver Falls, in the county of Beaver and State of Pennsylvania, have invented a certain new and useful Improvement in Renewal Elements for Semi-Dry-Cell Batteries, of which the following is a specification.

This invention pertains to certain new and useful articles or elements applicable to semi-dry cell batteries of the refillable or renewable type, my aim being to provide cheap and convenient forms of renewal materials that will be safely portable, and easily applied to the battery when the same becomes exhausted of its chemically generated electricity.

Reference is herewith made to my pending applications for patents on renewable dry cell batteries, Serial No. 720,824, dated September 17, 1912, and Serial No. 756,522, dated March 24, 1913, to which construction, therein described and shown, the invention herein sought to be protected is applicable. In said now pending applications I disclose a structure or form of so called "dry cell" battery in which the necessary elements required to set up chemically generated electricity within the cell, are made renewable and removably housed therein. The necessary renewal elements will consist of the zinc anode, depolarizing mass, and absorbent material for retaining or carrying the excitant electrolyte; the balance of the cell, including the cathode member, being preferably permanent and non-renewable. A further advantage in connection with said renewal elements consists in the new and novel means I employ in conjunction with the depolarizing member for preventing a union between said depolarizer and zinc anode, thereby overcoming or greatly minimizing local action within the cell.

The accompanying drawing discloses one embodiment of my invention, wherein—

Figure 1 shows a sectional view of three members constituting the renewal battery element in their relative positions when applied to the cell or receptacle for housing same. Fig. 2 is a plan view of the depolarizing member with its unprotected face uppermost, and Fig. 3 shows the renewal battery element composed of two units instead of three as disclosed in Fig. 1, the same being seated in a cell and held under adjustable compression.

The depolarizing mass, designated by the numeral 1, which can be made up of any suitable combination of elements, the most widely known and common ones being manganese dioxid and carbon, or graphite, in desired proportions, is thoroughly saturated and combined with suitable chemicals, such as sal ammoniac and chlorid of zinc, or any other substitute elements of a nature to serve as an excitant part of the depolarizing mass. A certain pre-determined amount of moisture may be added if necessary in order to reduce the said combined elements to a more or less plastic state, or they may all be united while dry, after which the entire mass is thoroughly stirred or mixed, when it is molded into the proper shape, and put under sufficient pressure to form a cake or block having a solid consistency, and of a pre-determined uniform thickness throughout. This formed cake, if found necessary, may then be put through a drying process, either by artificial heat or a natural drying-out means, when it becomes sufficiently hardened to be easily portable and will withstand ordinary handling without crumbling or disintegration. While the said depolarizing cake is being pressed into its required form, or subsequently thereto, one side and the edge has embedded therein by pressure means a suitable absorbent material 2, usually blotting paper of the required thickness, thus providing said formed cake with a closely adhering and supporting envelop or cover which, in addition to its function as a protecting medium for said pressed cake, acts as an adequate barrier or separating means to prevent any of the depolarizing element from reaching and coacting with the zinc anode to set up local action within the cell. The said absorbent material 2 will naturally expand when moisture is added to the previously dried cake 1, and as pressure is applied to the battery element through the medium of the adjustable lid or cover 9, as fully described in the former applications referred to in the preamble to this specification, said absorbent material, by reason of the expansion of said cake, will be forced to the wall of the cell 7, closely engaging the same, with the desired result that said depolarizing mass will be entirely separated from the zinc anode, thus avoiding internal local action. This is a vital condition in dry cells to be overcome, especially in batteries of this nature that are to be renewed by inexperienced persons. Said depolarizing cake in its prepared form will have sufficient density to render any tamping unnecessary when this member is placed in the receptacle.

A suitable absorbent material, usually blotting paper, constituting the supporting structure of the intermediate member shown in Fig. 1, may be made as an individual unit of the renewable battery element, the same being of a flat disk formation conforming to the configuration of its associated members, and is either saturated with the requisite chemicals constituting the excitant electrolyte or, as a modification, is provided on one side with a predetermined thickness or coating of a pasty substance impregnated with the excitant electrolyte, designated by the numeral 4. This latter mentioned formation will be of such a nature that the said coating will harden or congeal with proper treatment sufficient to render the said electrolyte convenient for handling, and which will readily and quickly be reduced to its original pasty or viscous condition when moisture is added thereto. In its dry condition this electrolyte carrying member can remain on the shelf or be kept in storage for an indefinite period without deterioration or danger of losing any of its chemical efficiency, and will only respond as an exciting agency when moisture is added; which is done either prior or subsequent to this said member's insertion in the receptacle.

In Fig. 3 I have shown my preferred form involving a combination of the renewal members reduced to two units, as a substitute for the three shown in Fig. 1. In this form the electrolyte containing paste, in its dried condition, is carried by the depolarizing cake, and forms a coating on the protecting cover 2. This combined depolarizer and electrolyte with the intermediate separating material in its finished state, being devoid of moisture can be kept indefinitely without material deterioration of the chemical constituents, thereby avoiding so called "shelf waste" which condition is so detrimental to the present well known forms of dry batteries.

The zinc anode, or electro-positive member 5, constitutes an essential part of the renewal element, and is made in the form of a flat disk or plate, conforming in configuration to the shape of the depolarizing cake, and carries a centrally positioned contact or screw binding post 6, which constitutes one pole of the battery. The under contacting face of this member will be attacked immediately on forming a union with the electrolytic paste, or the moistened absorbent material containing the excitant electrolyte, the several units constituting the renewal battery element thus coacting to produce chemically generated electricity.

The hereinbefore described renewal members will be especially advantageous for applying to flash light dry batteries of the refillable type, owing to the comparatively small area they will occupy, their cheapness of manufacture, and their convenience for handling.

As fully set forth in the pending applications referred to, the cell for receiving and housing these renewal members will be of permanent construction, and when the previously applied battery element becomes exhausted of its chemical efficiency, and the out-put of electricity ceases, these "burnt out" members are removed in a ready manner from the cell, and a fresh supply of previously prepared renewals are placed in the empty cell.

The depolarizing cake carrying the embedded separating material is first placed in the cell 7, with its unprotected surface contacting with the carbon cathode 8, which member preferably constitutes a fixed part of the cell, after which a pre-determined quantity of water is added or the cake may be dipped in water before insertion in the cell, thereby properly moistening the said depolarizing cake and absorbent binding material, after which step the zinc is positioned in contact with the excitant electrolyte, the terminal 6 projecting upward. The absorbent material 3, which has since manufacture been in a wholly or semi-dry state, will immediately take in its normal capacity of water, or it may be sufficiently moistened before insertion in the cell, when the electrolyte 4 will be reduced to its intended viscous consistency, and at once commence its attack on the zinc member 5, thereby setting up electrical activity within the cell.

I desire it understood that by the term carbon, as repeatedly used throughout the specification and claims, is intended to cover broadly any one or all of the recognized forms of carbons such as graphite and any kindred substances of a like nature commonly known and used in the battery art.

It is apparent that the depolarizing cake heretofore described can have any suitable configuration other than the circular formation shown. In referring to the "edge" of said depolarizing cake I mean the peripheral cylindrical surface or rim, the area of which is determined by the thickness and circumference of the materials constituting the completed cake. Should the mass have rectangular edge or rim surfaces the equivalent peripheral surfaces are meant thereby.

What I claim as my invention is:

1. A depolarizing member for use in semi-dry cell batteries of the refillable type comprising a portable compact mass having a substantially uniform thickness throughout, one side and the edge of said member having embedded therein an absorbent separating material.

2. A new article of manufacture for use in semi-dry cell batteries of the refillable type, comprising a mass of manganese dioxid and carbon impregnated with suitable chemicals of an excitant nature, said mass being in the form of a cake of a firm external consistency having a substantially uniform thickness throughout, and a suitable absorbent separating material embedded in and protecting one face and the rim of said cake.

3. In renewable elements for semi-dry cell batteries of the refillable type, a depolarizing member comprising a dry portable compact cake having a substantially uniform thickness throughout, one side and the rim thereof being substantially protected by a suitable absorbent separating material saturated with an excitant electrolyte normally held in a dry state, the entire member being inactive until assembled with suitable electrodes and moistened.

4. In renewal elements for semi-dry cell batteries of the refillable type, a dry integral cake comprising a depolarizing mass of substantially uniform thickness throughout, and an absorbent separating material substantially protecting and closely adhering to one side and the rim of the depolarizing mass, the absorbent material carrying an electrolyte in a dry state, the entire member being inactive until assembled with suitable electrodes and moisture added.

In testimony whereof, I affix my signature in the presnce of two witnesses.

WILLIAM BROAD.

Witnesses:
M. S. Thompson,
H. W. Stevenson.